(12) United States Patent
Perez-Ramirez et al.

(10) Patent No.: US 10,582,196 B2
(45) Date of Patent: *Mar. 3, 2020

(54) GENERATING HEAT MAPS USING DYNAMIC VISION SENSOR EVENTS

(71) Applicant: INTEL CORPORATION, Santa Clara, CA (US)

(72) Inventors: Javier Perez-Ramirez, Beaverton, OR (US); Srenivas Varadarajan, Bangalore (IN); Yiting Liao, Hillsboro, OR (US); Vallabhajosyula S. Somayazulu, Portland, OR (US); Omesh Tickoo, Portland, OR (US); Ibrahima J. Ndiour, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 246 days.

This patent is subject to a terminal disclaimer.

(21) Appl. No.: 15/640,198

(22) Filed: Jun. 30, 2017

(65) Prior Publication Data

US 2019/0007678 A1 Jan. 3, 2019

(51) Int. Cl.
| | |
|---|---|
| *H04N 19/109* | (2014.01) |
| *H04N 19/167* | (2014.01) |
| *H04N 19/172* | (2014.01) |
| *H04N 19/126* | (2014.01) |

(52) U.S. Cl.
CPC ......... *H04N 19/109* (2014.11); *H04N 19/126* (2014.11); *H04N 19/167* (2014.11); *H04N 19/172* (2014.11)

(58) Field of Classification Search
CPC ... H04N 19/109; H04N 19/167; H04N 19/172
See application file for complete search history.

(56) References Cited

U.S. PATENT DOCUMENTS

| | | | |
|---|---|---|---|
| 2009/0086816 A1 | 4/2009 | Leontaris et al. | |
| 2014/0195138 A1* | 7/2014 | Stelzig | G08G 1/0116 701/119 |
| 2014/0211842 A1* | 7/2014 | Zhao | H04N 19/147 375/240.02 |
| 2015/0287214 A1 | 10/2015 | O'Gorman et al. | |
| 2016/0375768 A1 | 12/2016 | Konet et al. | |
| 2017/0017299 A1 | 1/2017 | Biedert et al. | |
| 2017/0185867 A1 | 6/2017 | Lee et al. | |
| 2017/0243067 A1 | 8/2017 | Bulan et al. | |
| 2017/0316333 A1 | 11/2017 | Levinson et al. | |
| 2018/0191952 A1 | 7/2018 | Ardo et al. | |
| 2018/0249095 A1 | 8/2018 | Lee et al. | |

(Continued)

*Primary Examiner* — Siamak Harandi
(74) *Attorney, Agent, or Firm* — International IP Law Group, P.L.L.C.

(57) ABSTRACT

An example apparatus for encoding video frames includes a receiver to receive events from a dynamic vision sensor and a video frame from an image sensor. The apparatus also includes a heat map generator to generate a heat map based on the received events. The apparatus further includes a region of interest (ROI) map generator generate a ROI map based on the heat map. The apparatus includes a parameter adjuster to adjust an encoding parameter based on the ROI map. The apparatus also further includes a video encoder to encode the video frame using the adjusted parameter.

25 Claims, 10 Drawing Sheets

(56) References Cited

U.S. PATENT DOCUMENTS

2018/0300583 A1 10/2018 Peng et al.
2018/0302590 A1 10/2018 Kuzyakov et al.
2018/0302591 A1* 10/2018 Pio ........................ H04N 7/0117

* cited by examiner

300A

300B

300C

300D

300F

300E

400

GENERATING HEAT MAPS USING DYNAMIC VISION SENSOR EVENTS

BACKGROUND

Edge devices may be used to detect objects. An edge device is a device which provides an entry point into enterprise or service provider core networks. Examples include routers, routing switches, integrated access devices (IADs), multiplexers, and a variety of metropolitan area network (MAN) and wide area network (WAN) access devices. In some examples, an edge device may include a camera that is connected to the Internet. The edge device may capture video and send the captured video to an object detector. For example, the object detector may be an object detection service based in the cloud. The object detector may then detect one or more objects in the captured video.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, an edge device may capture video and send the captured video to an object detector. For example, the edge device may be part of an Internet of Things (IoT) framework that transmits information to a server for object detection. IoT frameworks generally may include low-powered edge devices that perform data capture and a set of cloud computing devices that perform computationally intensive tasks on the data transmitted from the edge devices. Computer-vision tasks like object recognition may be highly compute-intensive. Therefore, computer vision algorithms may be run on higher frequency servers in the cloud. For example, the cloud may be a plurality of servers supporting a computer vision service with flexible and powerful processing resources. However, raw video data transmitted to the cloud for processing may consume a lot of bandwidth. Thus, some computer vision systems may compress video frames before transmitting the frames over the network to the cloud for object detection. However, video-compression introduces visual artifacts and loss of details in the video frames which affect the accuracy of computer vision algorithms.

The present disclosure relates generally to techniques for encoding video using heat maps generated using dynamic vision sensor events. Specifically, the techniques described herein include an apparatus, method and system for encoding video using heat maps generated using dynamic vision sensor events. An example apparatus includes a receiver to receive events from a dynamic vision sensor. For example, the events may include positive events indicating an increase in light at some pixels and negative events indicating decreases in light at some pixels. The apparatus includes a heat map generator to generate a heat map based on the received events. The apparatus further includes a region of interest (ROI) map generator that is to generate a ROI map based on the heat map. The apparatus also includes a parameter adjuster to adjust an encoding parameter based on the ROI map. The apparatus further includes a video encoder to encode a video frame using the adjusted parameter.

The techniques described herein thus enable video heat maps to be generated with low latency, low cost and high accuracy. For example, techniques can achieve a very high frame rate compared to standard camera sensors, which provide low latency results with high frame rate accuracy. DVS cameras provide information about these ROIs directly at the edge with much higher temporal resolution. For example, the temporal resolution may be approximately) microsecond. In addition, the techniques described herein may have lower power consumption and generate the results at a low data rate compared to using standard cameras. Third, the techniques described herein may provide accurate information on where the activities happen in the spatial domain.

Figure 1:
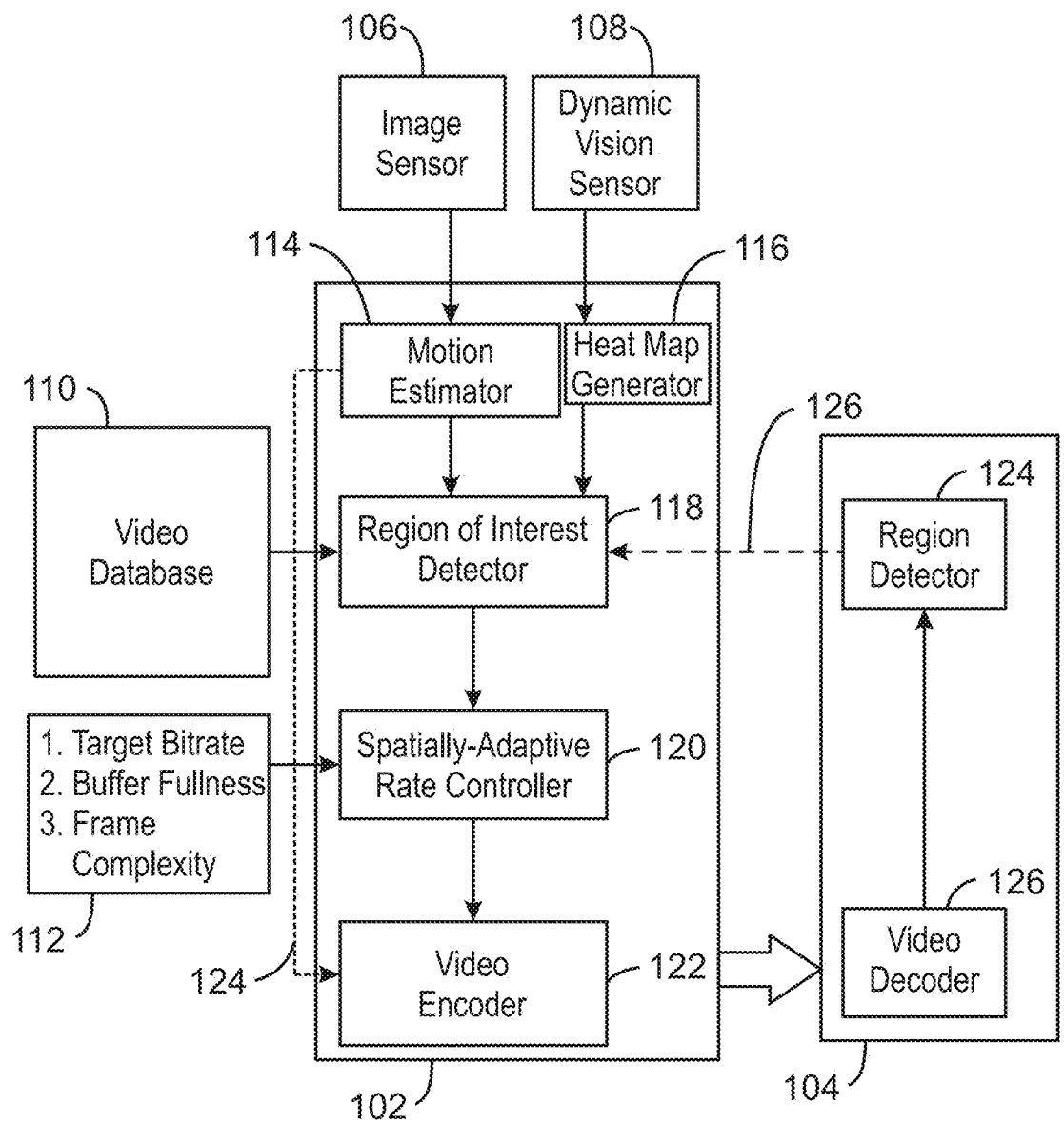
FIG. 1 is a block diagram illustrating an example system for generating heat maps using dynamic vision sensor events.

FIG. 1 is a block diagram illustrating an example system for generating heat maps based on dynamic vision sensor events. The example system is referred to generally by the reference number 100 and can be implemented in the computing device 500 below in FIG. 5 using the method 400 of FIG. 4 below.

The example system 100 includes an edge processor 102, a cloud processor 104, an image sensor 106, a dynamic vision sensor (DVS) 108, a video database 110, and a user interface 112. The edge processor 102 includes a motion estimator 114, a heat map generator 116, a region of interest generator 118, a spatially-adaptive rate controller 120, and a video encoder 122. The cloud processor 104 includes a region detector 124 and a video decoder 126.

As shown in FIG. 1, the edge processor 102 may receive video frames from the image sensor 106 and corresponding events from a dynamic vision sensor (DVS) 108 and send encoded video frames to the cloud processor 104 for region detection. For example, a DVS camera may send events that were each triggered when light intensity changes were perceived in the pixels of the DVS camera. The motion estimator 114 may receive a current video frame and divide the video frame into Macroblocks (MBs). For example, the MBs may each be 16×16 pixels in size. For each MB of the current frame, the motion estimator 114 may select a closest matching region from the previous frame through Motion Estimation. The spatial displacement of the current MB from the closest matching region is the Motion Vector (MV) for the MB. The displacement may be measured in number of pixels. In some examples, the difference between the pixels in the two regions constitutes a residual for the MB. The error in motion estimation (ME Error) can be quantified as the Sum of Absolute Difference (SAD) or the Sum of Squared Error (SSE) and can be derived from the residual.

The heat map generator 116 may receive events from a dynamic vision sensor 108 and generate a heat map for a current video frame based on the events. The events may include positive events corresponding to detected increases in light intensity and negative events corresponding to detected decreases in light intensity. For example, the heat map may be generated using the process described with respect to FIG. 2 below.

The region of interest detector 118 can detect regions of interest. In some examples, regions of interest can be detected based on a priori expected regions from the video database 110. The a priori expected regions may be obtained empirically from a predetermined amount of video-data, such as 100+ hours, obtained in a specified set up on which the ground-truth locations of the object of interest are annotated. For example, while detecting pedestrians on a road using an external camera mounted on a car, some regions of the video may contain more human activity than others and thus be annotated as ground-truth locations of objects of interest for persons.

In some examples, the region of interest detector 118 can detect regions of interest in a video frame based on prior region detections in a previous frame. For example, given a detected region in the previous frame, a larger region of interest box can be assigned as the ROI in the current frame, as the object may move anywhere in this region. In some examples, the size of the box may be depend on the video frame rate, the upper bound of the moving speed, etc. Additionally, in some examples, the region of interest detector 118 can detect an ROI from previous detections and the amount of object motion between current and the past frames. For example, an average of all motion vectors (MVs) falling with in the previously detected bounding box can be used to calculate an expected shift of the bounding box in the current frame and hence the ROI.

Moreover, in some examples, the region of interest detector 118 can detect regions of interest in a video frame based on appearance of "new" objects in a video frame which was not present in the previous frame. These objects may neither have been detected nor tracked from the previous frame. Since there are no matching regions in the previous frame for the MBs constituting these new object regions in the current frame, the Motion Estimation (ME) error may be higher in these regions than other regions in the frame. For example, the ME may be measured as sum of squared error (SSE) or sum of absolute differences (SAD). A high ME Error may be a good indicator of new objects and hence the corresponding MBs may also constitute the ROI. In some examples, since video encoders like H.264 use Intra-coded MBs in a P-frame when the ME Error is high, intra-coded MBs can also be used for detecting new objects and ROI generation.

The region of interest detector 118 can also detect regions of interest in a video frame based on a heat map received from the heat map generator 116. An example heat map and resulting detected regions of interest are shown and described below with respect to FIGS. 3E and 3F, respectively.

Additionally, the region of interest detector 118 can generate an ROI map based on the detected ROIs. As used herein, an ROI map may be a mask indicating regions of interest in a frame. For example, the ROI map may constitute final ROIs for a video frame. In some examples, an ROI map may be generated for a video frame that is based on the union of the ROIs obtained based on any combination of the detected ROIs described above.

The spatially-adaptive rate controller 120 can perform spatially-adaptive QP selection. For example, the rate controller 120 may perform an optimal bit-allocation towards maximizing perceptual video quality. In some examples, the bit allocation may be performed by controlling the amount of quantization on a transformed prediction error, or residual. For example, the residual may be received from the motion estimator 114 as shown by an arrow 124. In some examples, higher QP may be associated with higher the compression and less perceptual quality. However, in an IoT frame-work catered towards a computer vision (CV) task like Object Recognition, preserving the semantics may be more important than perceptual quality. As used herein, perceptual quality refers to an overall clarity of an image as perceived by the human eye. Thus, the ROIs obtained from the ROI detector 118 may be used for preserving semantics. In some examples, the MBs within the ROI regions may be encoded with a lower QP (higher quality), while the non-ROI MBs are coded with a higher QP (lower quality) in order to attain a highly accurate object recognition in the cloud. In some examples, a negative or a positive QP offset with respect to the frame QP can be applied at a MB level to decrease or increase the macroblock QP, respectively. In some examples, a target bitrate, buffer fullness, and frame complexity may be received from the user interface 112.

The video encoder 122 may perform transformation, quantization and entropy coding. For example, the video encoder 122 may be any suitable video encoder. In some examples, the pixel error between the current MB and the closest matching MB is first transform coded by applying a Discrete Cosine Transform (DCT) and then the frequency coefficients are quantized using the QP obtained from the spatially-adaptive rate controller 120. In some examples, the quantized data can then be entropy coded and transmitted to the cloud processor 104. By encoding the ROIs with a higher fidelity and the non-ROIs with a lower fidelity, higher object recognition accuracy may be obtained at a given bit-rate.

The cloud processor 104 may thus receive encoded video frames from the edge processor 102 and detect objects. For example, the video decoder 126 may decode the received video from the edge processor 102 into RGB frames. In some examples, these decoded frames are input to a trained deep neural network (DNN) for detecting the objects of interest. For example, the decoded frames may be input into a trained Fast-R region-based convolutional neural network (CNN). In some examples, the region detections corresponding to detected objects may then be relayed back to the edge processor 102, as shown by a dotted arrow 126, for computing ROIs in future video frames.

The diagram of FIG. 1 is not intended to indicate that the example system 100 is to include all of the components shown in FIG. 1. Rather, the example system 100 can be implemented using fewer or additional components not illustrated in FIG. 1 (e.g., additional processors, cameras, etc.).

Figure 2:
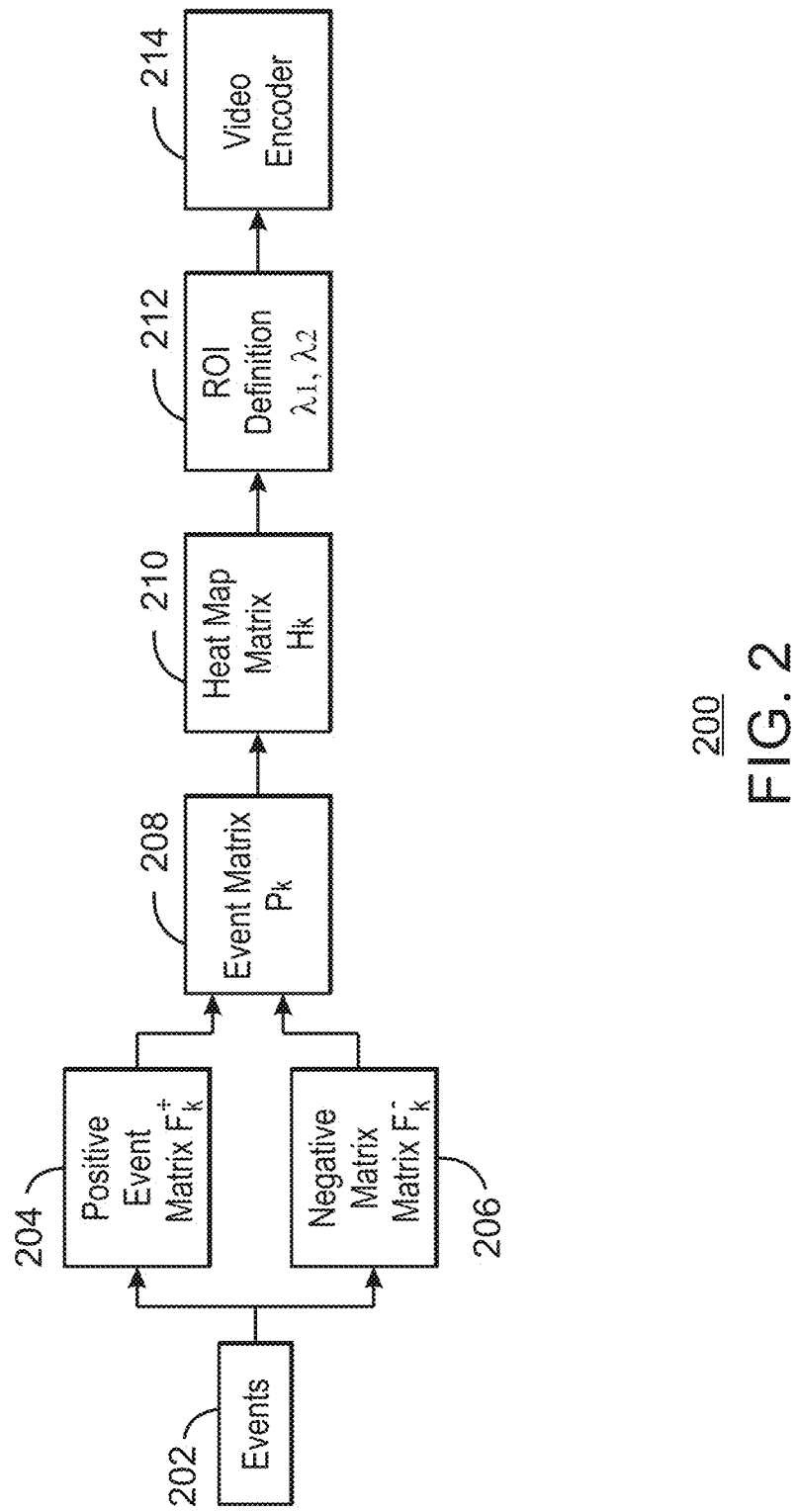
FIG. 2 is a flow chart illustrating an example process for encoding video using heat maps generated using dynamic vision sensor events.

FIG. 2 is a flow chart illustrating an example process for encoding video using heat maps generated using dynamic vision sensor events. The example process is generally referred to by the reference number 200 and can be implemented in the edge device processor 102 above or the computing device 500 below.

At block 202, a set of events is received at a processor from a DVS camera. For example, the events may include positive events and negative events. In some examples, the DVS may be of size N×M pixels. In some examples, a heat map frame rate may be defined using the equation:

$$f_h = \frac{1}{T_h} \qquad \text{Eq. 1}$$

where $f_h$ is the frequency at which heat maps are generated and $T_h$ is the length of time during which events are captured from the DVS camera to later construct the heat maps.

At block 204, the processor generates a positive event matrix. For example, the positive event matrix may include all positive events received from the DVS camera within a predetermined period of time. In some examples, the matrix $F_k^+$ may be of size N×M. For example, the (n,m)-th entry of the matrix $F_k^+$ may contain the number of positive polarity events registered by the (n,m)-th DVS camera pixel in the time interval $[(k-1)T_h, kT_h)$, where k is an index variable.

At block 206, the processor generates a negative event matrix. For example, the positive event matrix may include all negative events received from the DVS camera within a predetermined period of time. Similar to block 204, the matrix $F_k^-$ may also be of size N×M. Each matrix element of matrix $F_k^-$ may contain the total number of negative events in the same time interval $[(k-1)T_h, kT_h)$, where k is an index variable.

At block 208, an event matrix is generated based on the positive event matrix and the negative event matrix. For example, the event matrix $P_k$ may be generated using the equation:

$$P_k = F_k^+ + F_k^- \qquad \text{Eq. 2}$$

where the (n,m)-th entry of $P_k$ denotes the number of polarity events in the (n,m)-th pixel of the camera during the time interval $[(k-1)T_h, kT_h)$, wherein k is an index variable.

At block 208, a heat map matrix is generated based on the event matrix. For example, heat map matrix $H_k$ of size N/B×M/B may be generated, where the (n,m)-th entry of $H_k$ is given by the equation:

$$H_k(n,m) = \frac{1}{T_h} \sum_{i=(n-1)M+1, j=(m-1)M+1}^{nM, mM} P_k(i,j) \qquad \text{Eq. 3}$$

The heat map matrix may also be referred to herein as heat maps. The heat maps generated by DVS can be used to adjust the video-encoder parameters in the ROI-based video coding scheme described in FIG. 1 above. For example, each element of $H_k$ may be inversely proportional to the temporal correlation observed in the captured video at a macroblock level and can be used to adjust the quantization parameter (QP) in the video encoder.

In some examples, low values of $f_h$ may be sufficient to generate heat maps for good object detection. For example, a low value of $f_h$ may be 24 Hz. However, corner cases in which objects suddenly appear in regions of the image with high temporal correlation can cause an increase in the probability of misdetection. The use of DVS cameras may allow the generation of heat maps with extremely high frequency (low latency), which in turn could be used to address these high corner cases. For example, corner cases may refer to cases in which values of parameters such as $f_h$ may be at their lower or higher values.

This process flow diagram is not intended to indicate that the blocks of the example process 200 are to be executed in any particular order, or that all of the blocks are to be included in every case. Further, any number of additional blocks not shown may be included within the example process 200, depending on the details of the specific implementation.

Figure 3A:
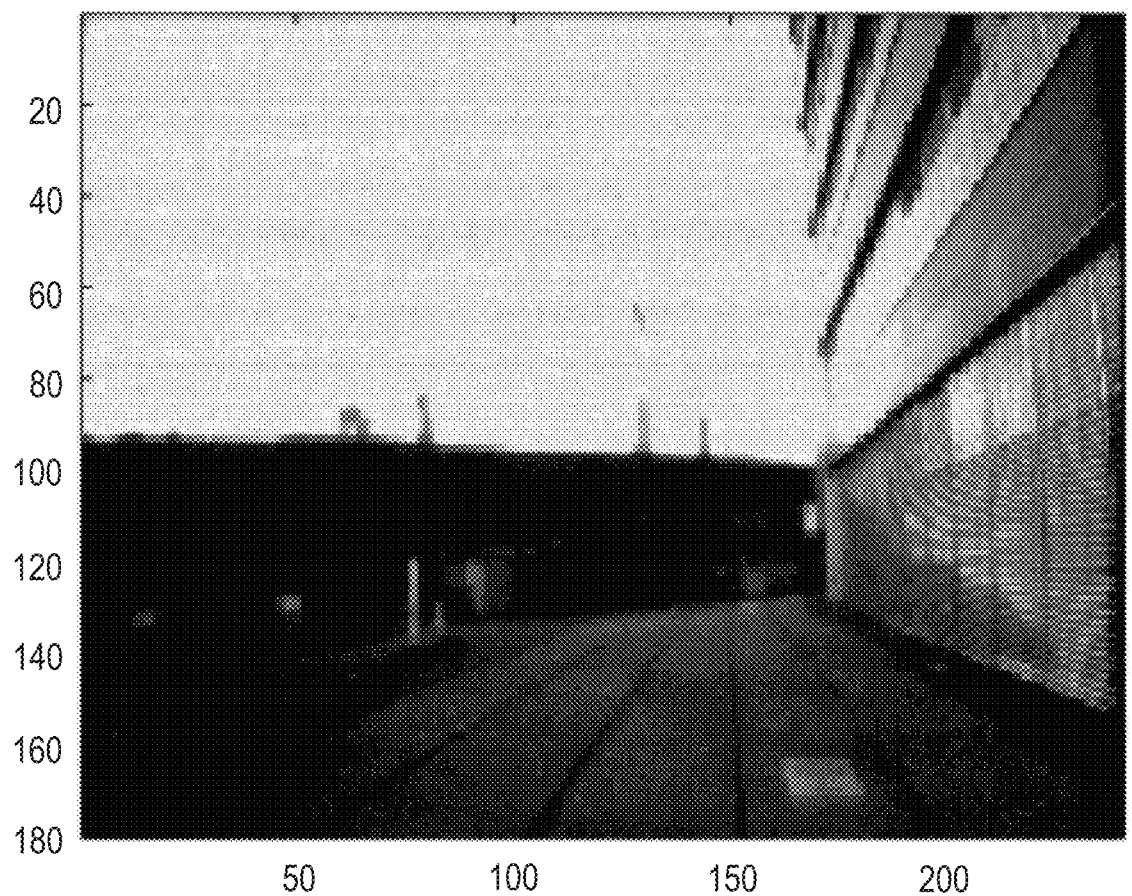
FIG. 3A is an image illustrating an example video frame from an edge device.

FIG. 3A is an image illustrating an example video frame from an edge device. The example video frame is generally referred to by the reference number 300A and can be implemented in the computing device 500 below. For example, the video frame 300A can be generated using the image sensor 106 of FIG. 1 above or the sensors 526 of the computing device 500 of FIG. 5 below.

FIG. 3A shows a low resolution black and white video frame 300A of a scene in which one or more objects may be detected using regions of interest. For example, the video frame may be 180×250 pixels in size.

The diagram of FIG. 3A is not intended to indicate that the example video frame 300A is to include all of the components shown in FIG. 3A. Rather, the example video frame 300A can include fewer or additional components not illustrated in FIG. 3A (e.g., additional pixels, etc.).

Figure 3B:
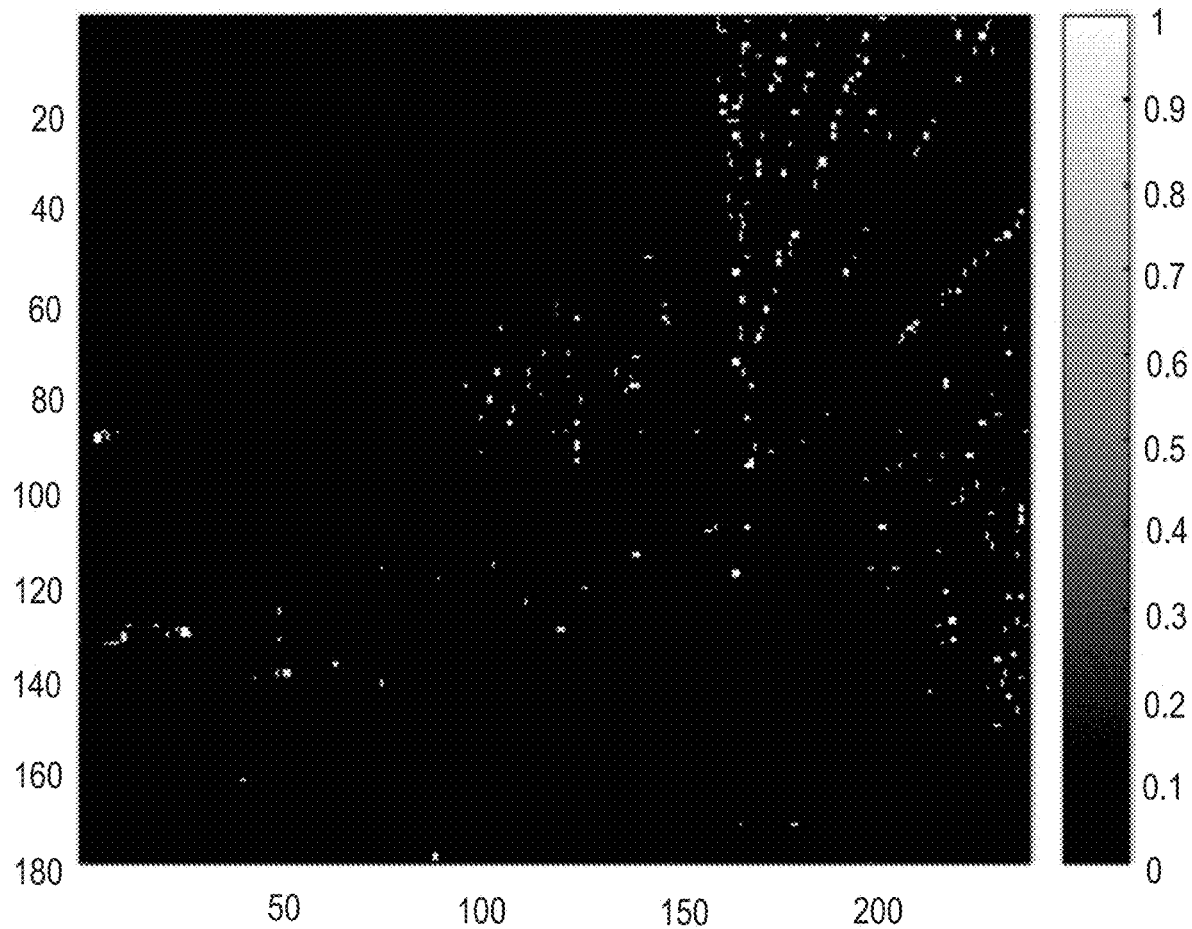
FIG. 3B is an image illustrating an example positive event matrix.

FIG. 3B is an image illustrating an example positive event matrix. The example positive event matrix is generally referred to by the reference number 300B and can be implemented in the computing device 500 below. For example, the positive event matrix 300B can be generated using the process 200 of FIG. 2, the heat map generator 532 of the computing device 500 of FIG. 5 below, or the heat map generator 608 of the computer readable media 600 of FIG. 6 below.

FIG. 3B shows a set of detected positive events represented as lighter regions in the positive event matrix 300B. For example, the lighter the region, the greater the detected positive change in light intensity. As also shown in FIG. 3B, the size of the positive event matrix 300B may match the size of the video frame 300A. For example, the size of the positive event matrix 300B may also be 180×250 pixels. In some examples, the values for negative events may be represented in a separate negative event matrix as described below.

The diagram of FIG. 3B is not intended to indicate that the example positive event matrix 300B is to include all of the components shown in FIG. 3B. Rather, the example positive event matrix 300B can be implemented using fewer or additional components not illustrated in FIG. 3B (e.g., additional events, values, shades, pixels, etc.).

Figure 3C:
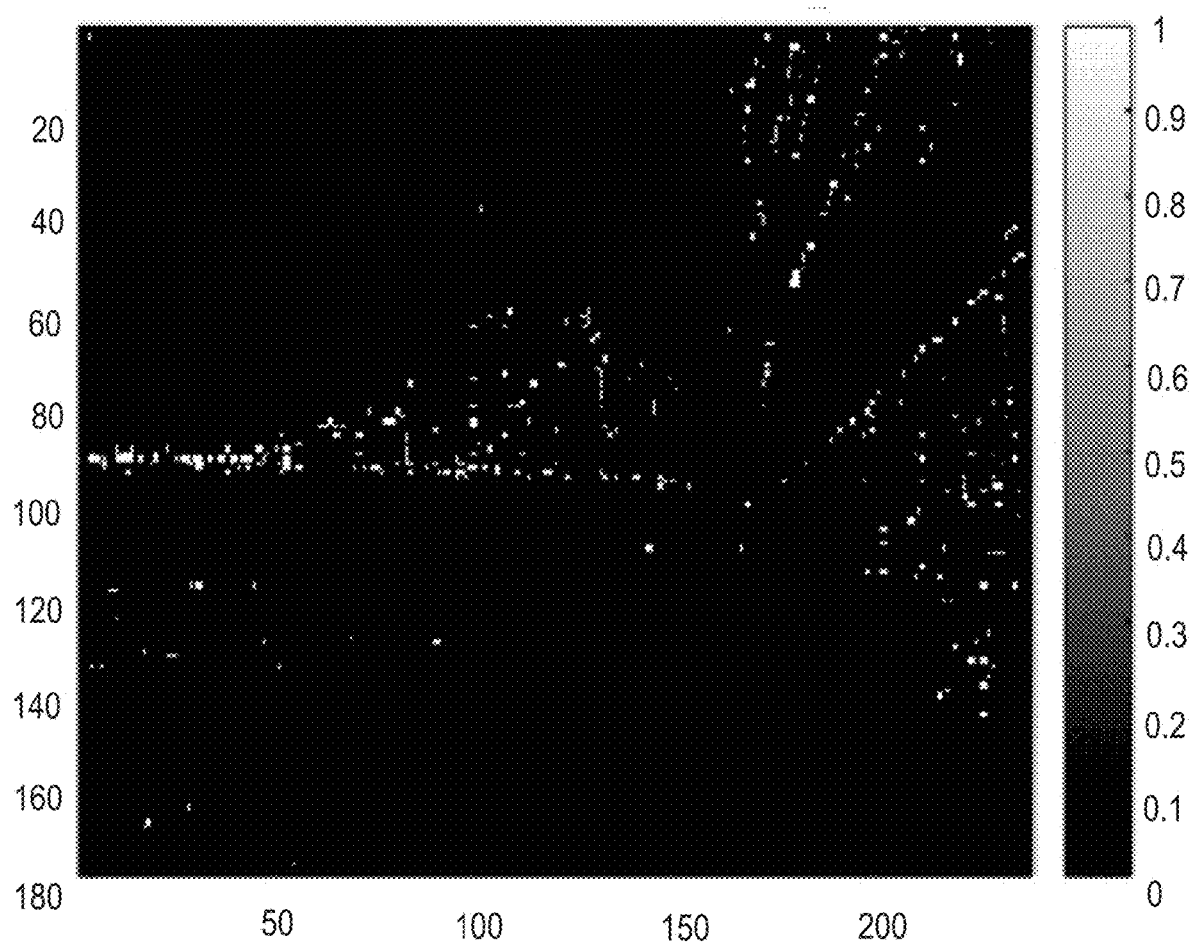
FIG. 3C is an image illustrating an example negative event matrix.

FIG. 3C is an image illustrating an example negative event matrix. The example negative event matrix is generally referred to by the reference number 300C and can be implemented in the computing device 500 below. For example, the negative event matrix 300B can be generated using the process 200 of FIG. 2, the heat map generator 532 of the computing device 500 of FIG. 5 below, or the heat map generator 608 of the computer readable media 600 of FIG. 6 below.

FIG. 3C shows a set of detected negative events represented as lighter regions in the negative event matrix 300C. For example, the lighter the region, the greater the detected negative change in light intensity. As also shown in FIG. 3C, the size of the negative event matrix 300C may also match the size of the video frame 300A. For example, the size of the negative event matrix 300C similarly be 180×250 pixels.

The diagram of FIG. 3C is not intended to indicate that the example negative event matrix 300C is to include all of the components shown in FIG. 3C. Rather, the example negative event matrix 300C can be implemented using fewer or additional components not illustrated in FIG. 3C (e.g., additional events, values, pixels, etc.).

Figure 3D:
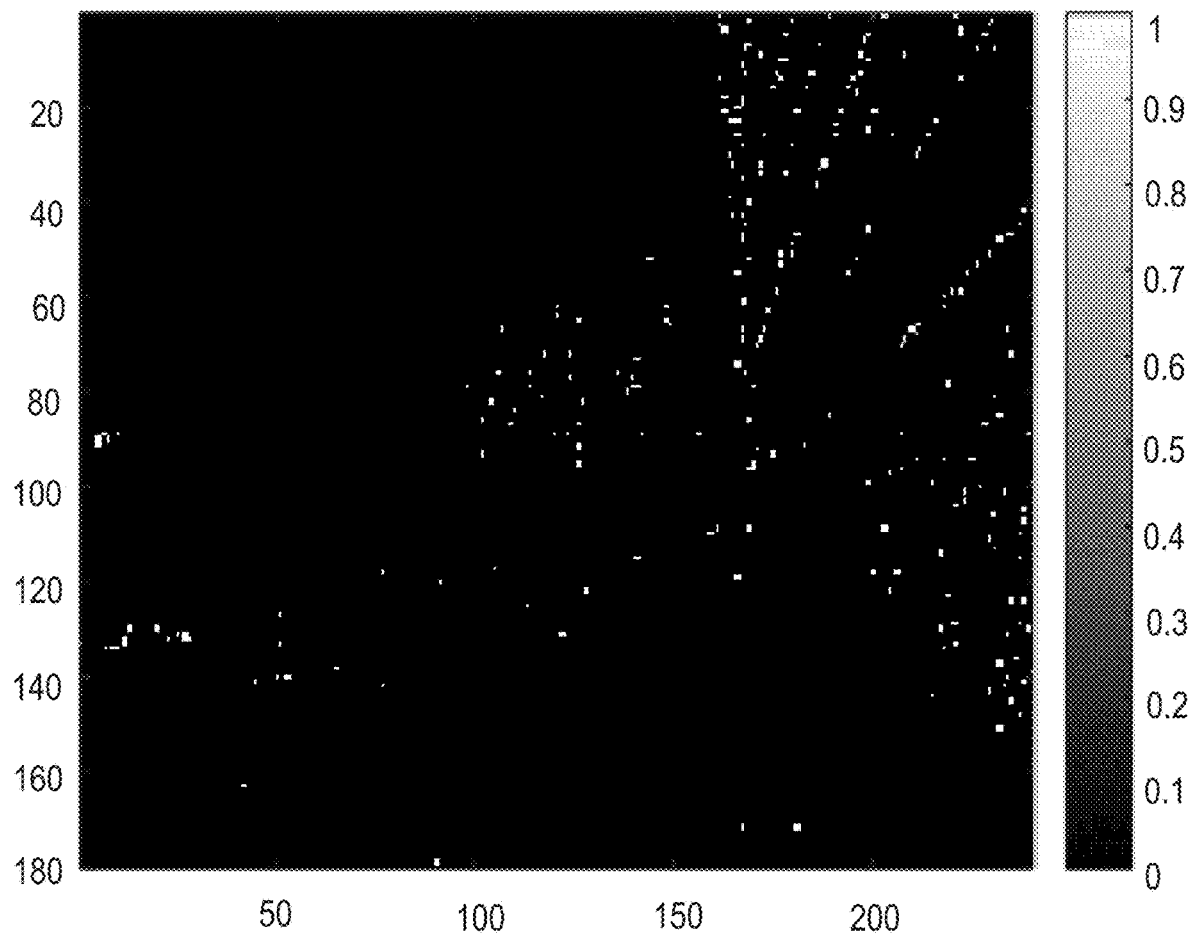
FIG. 3D is an image illustrating an example combined event matrix.

FIG. 3D is an image illustrating an example combined event matrix. The example combined event matrix is generally referred to by the reference number 300D and can be implemented in the computing device 500 below. For example, the combined event matrix 300D can be generated using the process 200 of FIG. 2, the heat map generator 532 of the computing device 500 of FIG. 5 below, or the heat map generator 608 of the computer readable media 600 of FIG. 6 below.

FIG. 3D shows set of combined events represented as lighter regions in the negative event matrix 300D. In some examples, the lighter the region, the greater the detected absolute change in light intensity. For example, the lighter regions may have a larger number of combined detected positive events and negative events at the corresponding pixels. Similarly, darker regions may have a smaller number of combined positive events and negative events received from the corresponding pixels. As also shown in FIG. 3D, the size of the combined event matrix 300D may also match the size of the video frame 300A. For example, the size of the positive event matrix 300D similarly be 180×250 pixels. The event matrix 300D may have been generated using Eq. 2 above with the values with $f_h$=1000 Hz, B=16, $\lambda_1$=300, and $\lambda_2$=800.

The diagram of FIG. 3D is not intended to indicate that the example combined event matrix 300D is to include all of the components shown in FIG. 3D. Rather, the example combined event matrix 300D can be implemented using fewer or additional components not illustrated in FIG. 3D (e.g., additional events, values, pixels, etc.).

Figure 3F:
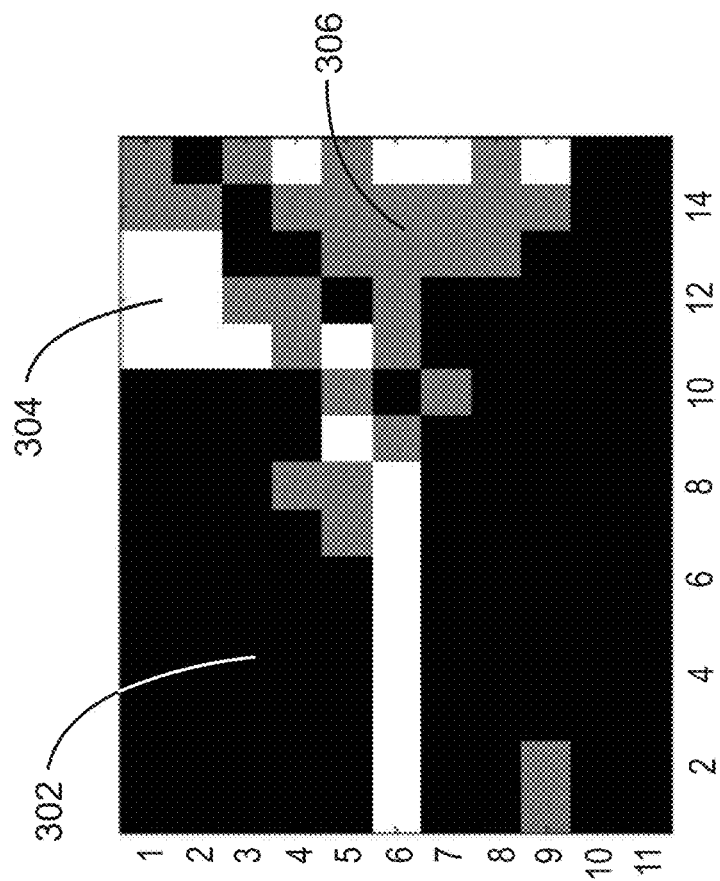
FIG. 3F is an image illustrating an example generated ROI map.
Figure 3E:
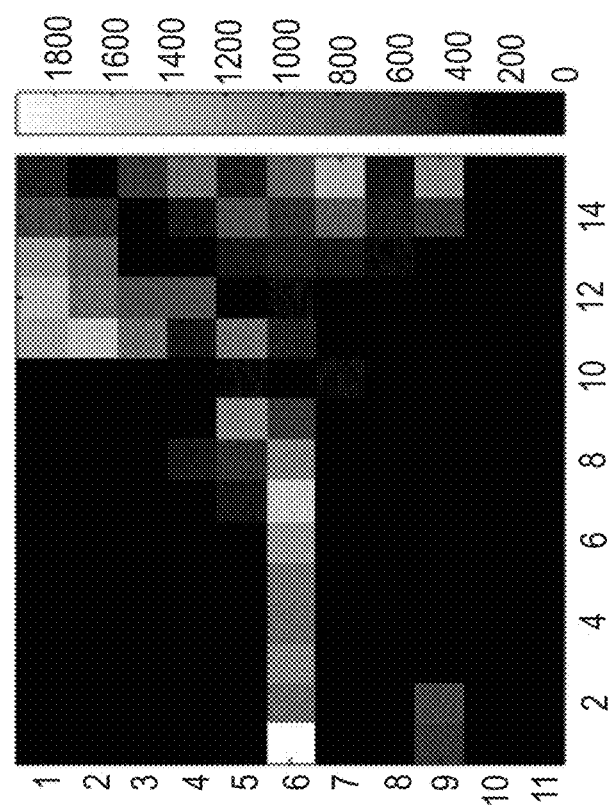
FIG. 3E is an image illustrating an example generated heat map.

FIG. 3E is an image illustrating an example generated heat map. The example heat map is generally referred to by the reference number 300E and can be implemented in the computing device 500 below. For example, the heat map 300E can be generated using the process 200 of FIG. 200, the heat map generator 532 of the computing device 500 of FIG. 5 below, or the heat map generator 608 of the computer readable media 600 of FIG. 6 below.

FIG. 3E shows a set of macro blocks that are shaded based on number of detected changes in light intensity over a predetermined period of time. For example, a greater number of detected changes may be represented using a lighter shade. As shown in FIG. 3E, the number of detected changes is greater at the center of the heat map 300E and the top right of the heat map 300E. The heat map matrix 300E may have been generated using Eq. 3 above. For example, the heat map may have been constructed using a DVS camera with $f_h$=1000 Hz and B=16. In some examples, to adjust the quantization parameter in the encoder, two threshold levels $\lambda_1$ and $\lambda_2$ may be selected to define three types of ROIs. For example, a first ROI $ROI_1(QP_1)$ may be defined by the elements of $H_k<\lambda_1$. A second ROI, $ROI_2(QP_2)$ may be defined by the elements $\lambda_1<H_k<\lambda_2$. Likewise, a third ROI $ROI_3(QP_3)$ may be defined by the elements of $H_k>\lambda_2$. The quantization parameters (QPs) $QP_1$, $QP_2$, and $QP_3$ may be selected such that $QP_1>QP_2>QP_3$. For example, a higher QP may denote lower image quality. The threshold values $\lambda_1$ and $\lambda_2$ may be empirically selected for optimal operation of object detection algorithms. For example, current DVS camera resolutions may be low, such as about 128×128 pixels. Thus, DVS cameras may be insensitive to events associated to background movements such as leave movements in trees or lighting changes from cloud movements. In some examples, the use of higher resolution DVS cameras may thus also include post-processing or morphological operations on the ROI mask to avoid spurious generation of ROIs.

The diagram of FIG. 3E is not intended to indicate that the example heat map 300E is to include all of the components shown in FIG. 3E. Rather, the example heat map 300E can be implemented using fewer or additional components not illustrated in FIG. 3E (e.g., additional shades, macro blocks, etc.).

FIG. 3F is an image illustrating an example region of interest (ROI) map. The example ROI map is generally referred to by the reference number 300F and can be implemented in the computing device 500 below. For example, the ROI map 300F can be generated using the process 200 of FIG. 2, the ROI map generator 534 of the computing device 500 of FIG. 5 below, or the ROI map generator 610 of the computer readable media 600 of FIG. 6 below.

FIG. 3F shows a set of regions, including a region of no changes 302, a region of high change, and a region of moderate change. In some examples, a bounding box may be generated to include regions 304 and 306 as a region of interest. For example, the higher amount of change in light intensity may correspond to a moving object to be detected. In some examples, the ROI map may be forwarded to a parameter adjuster to enable the parameter adjuster to increase compression of the region 302 while maintaining clarity and detection accuracy in regions 304 and 306. Thus, video frames may then be compressed in an encoder for sending via a network, without losing image quality and thus detection accuracy at regions of interest.

The diagram of FIG. 3F is not intended to indicate that the example ROI map 300F is to include all of the components shown in FIG. 3F. Rather, the example ROI map 300F can be implemented using fewer or additional components not illustrated in FIG. 3F (e.g., additional regions of interest, macro blocks, etc.).

Figure 4:
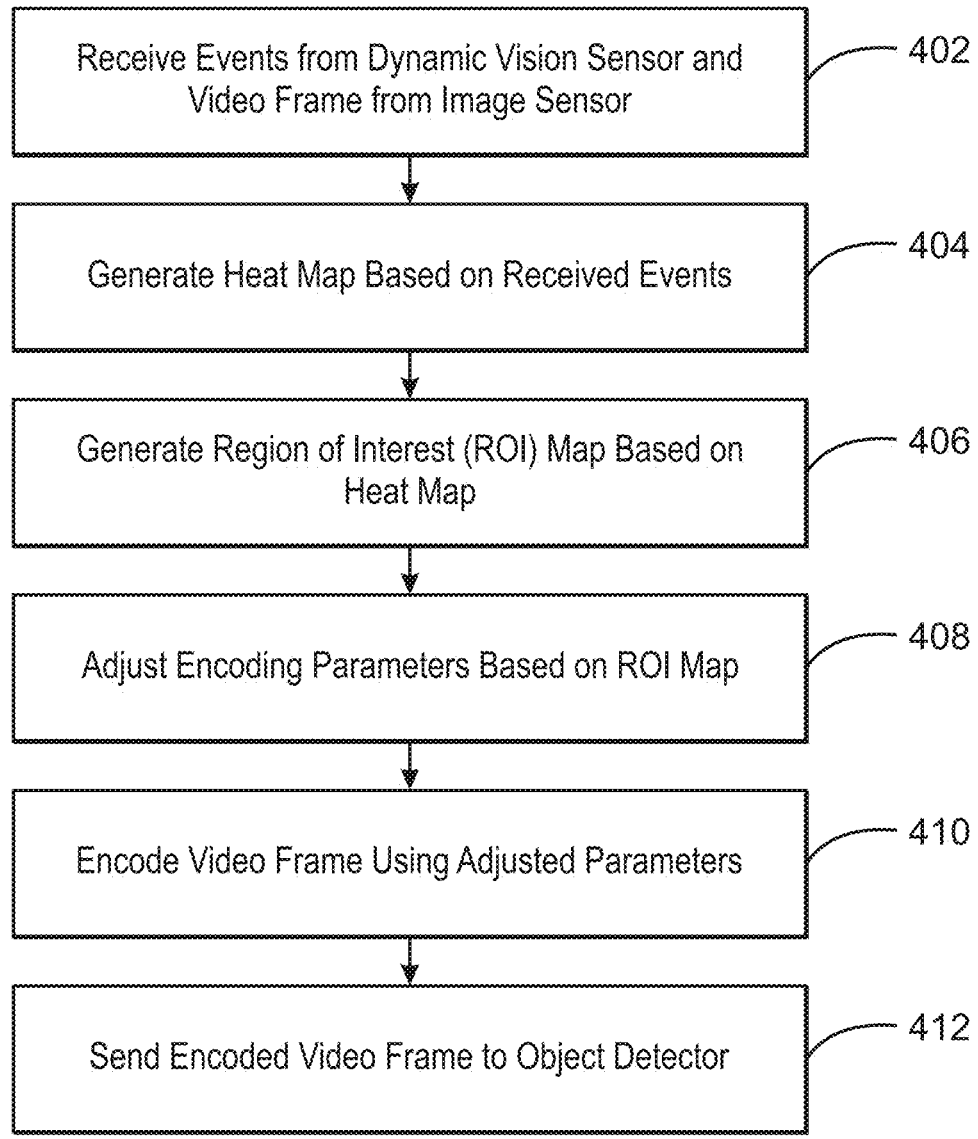
FIG. 4 is a flow chart illustrating a method for encoding video using heat maps generated using dynamic vision sensor events.

FIG. 4 is a flow chart illustrating a method for encoding video using heat maps generated using dynamic vision sensor events. The example method is generally referred to by the reference number 400 and can be implemented in the edge processor device 102 of FIG. 1 above, the processor 502 of the computing device 500 of FIG. 5 below, or the computer readable media 600 of FIG. 6 below.

At block 402, a processor receives an event from a dynamic vision sensor and a video frame from an image sensor. For example, the event may be a negative event or a positive event corresponding to a change in light intensity detected at a smart pixel of the dynamic vision sensor.

At block 404, the processor generates a heat map based on the received event. In some example, the processor can generate a positive event matrix and a negative event matrix. For example, the received event may be recorded into the positive event matrix or the negative event matrix. The processor can then generate a combined event matrix based on the positive event matrix and the negative event matrix. The processor can then generate the heat map based on the combined event matrix. For example, the heat map may be generated using the process 200 described in FIG. 2 above.

At block 406, the processor generates a region of interest (ROI) map based on the heat map. In some examples, the processor can detect regions of interest based on received expected object regions and the heat map and generate the ROI map based on the detected regions of interest. In some examples, the processor can detect regions of interest based on an object detection from a previous frame and the heat map, and generate the ROI map based on the detected regions of interest. In some examples, the processor can detect regions of interest based on a detected new object in the video frame and the heat map, and generate the ROI map based on the detected regions of interest. For example, the ROI map may be generated using the process 200 described in FIG. 2 above.

At block 408, the processor adjusts an encoding parameter based on the ROI map. In some examples, the encoding parameters may be adjusted based on the ROI map to improve the performance of the computer vision algorithms for a given bandwidth. For example, the processor can increase a quantization parameter of a macroblock of the video frame in response to detecting that the macroblock does not correspond to any region of interest in the ROI map. Similarly, the processor can decreasing a quantization parameter of a macroblock of the video frame in response to detecting that the macroblock corresponds to a region of interest in the ROI map.

At block 410, the processor encodes the video frame using the adjusted parameter. In some examples, the adjusted parameter may be used to compress regions of a video frame outside regions of interest, while maintaining quality of the regions of interest. For example, macroblocks of a video frame with higher quantization parameter (QP) values may be more compressed than macroblocks with lower QP values. Thus, pixels in the video frame corresponding to regions of interest in the ROI map may be encoded in higher quality than other regions.

At block 412, the processor sends the encoded video frame to an object detector. For example, the processor may have the encoded video frame sent to a cloud processor over any suitable network connection.

This process flow diagram is not intended to indicate that the blocks of the example process 400 are to be executed in any particular order, or that all of the blocks are to be included in every case. Further, any number of additional blocks not shown may be included within the example process 400, depending on the details of the specific implementation.

Figure 5:
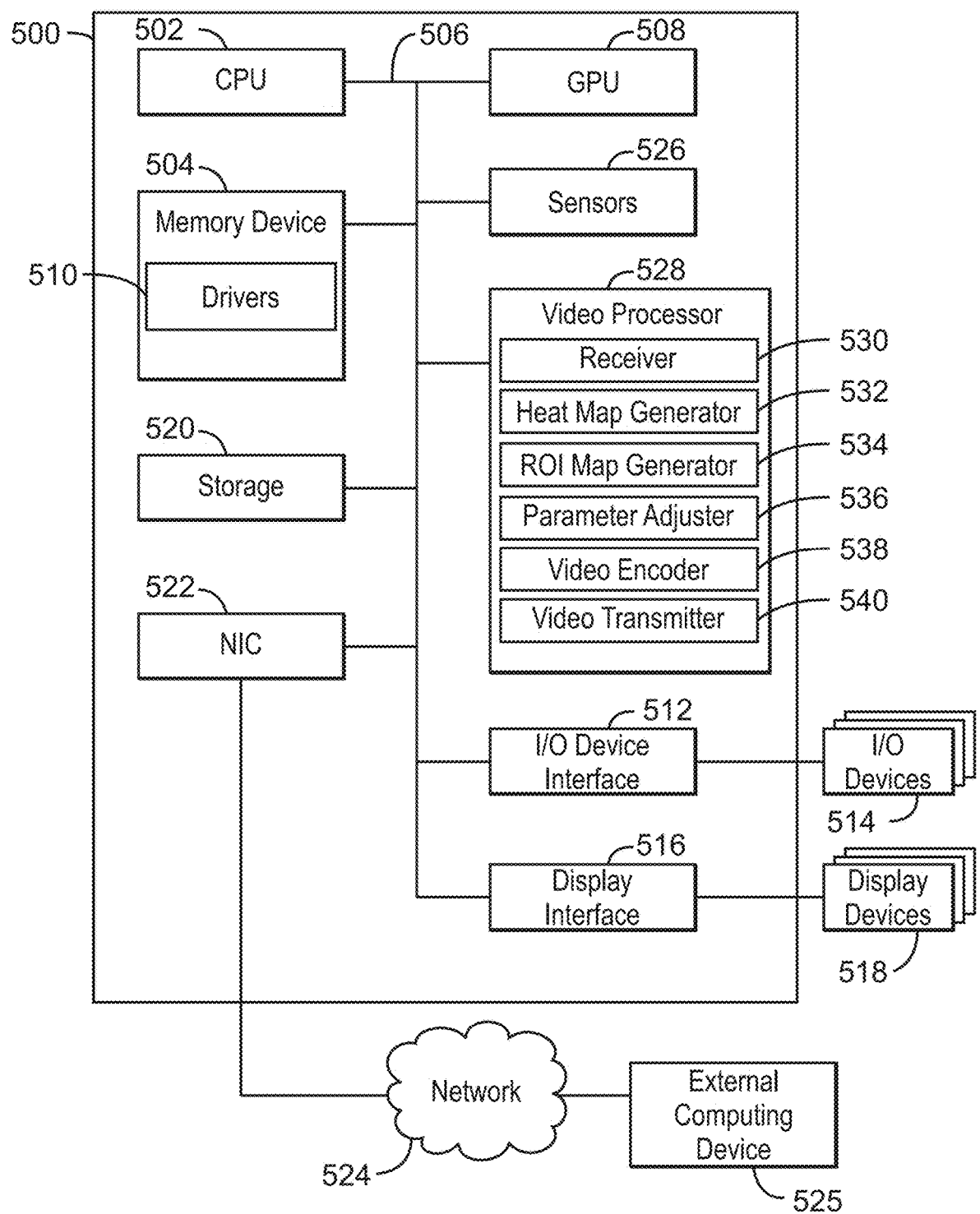
FIG. 5 is block diagram illustrating an example computing device that can encode video using heat maps generated using dynamic vision sensor events.

Referring now to FIG. 5, a block diagram is shown illustrating an example computing device that can encode video using heat maps+using dynamic vision sensor events. The computing device 500 may be, for example, a laptop computer, desktop computer, tablet computer, mobile device, or wearable device, among others. In some examples, the computing device 500 may be a smart camera or a digital security surveillance camera. The computing device 500 may include a central processing unit (CPU) 502 that is configured to execute stored instructions, as well as a memory device 504 that stores instructions that are executable by the CPU 502. The CPU 502 may be coupled to the memory device 504 by a bus 506. Additionally, the CPU 502 can be a single core processor, a multi-core processor, a computing cluster, or any number of other configurations. Furthermore, the computing device 500 may include more than one CPU 502. In some examples, the CPU 502 may be a system-on-chip (SoC) with a multi-core processor architecture. In some examples, the CPU 502 can be a specialized digital signal processor (DSP) used for image processing. The memory device 504 can include random access memory (RAM), read only memory (ROM), flash memory, or any other suitable memory systems. For example, the memory device 504 may include dynamic random access memory (DRAM).

The memory device 504 can include random access memory (RAM), read only memory (ROM), flash memory, or any other suitable memory systems. For example, the memory device 504 may include dynamic random access memory (DRAM). The memory device 504 may include device drivers 510 that are configured to execute the instructions for device discovery. The device drivers 510 may be software, an application program, application code, or the like.

The computing device 500 may also include a graphics processing unit (GPU) 508. As shown, the CPU 502 may be coupled through the bus 506 to the GPU 508. The GPU 508 may be configured to perform any number of graphics operations within the computing device 500. For example, the GPU 508 may be configured to render or manipulate graphics images, graphics frames, videos, or the like, to be displayed to a user of the computing device 500.

The memory device 504 can include random access memory (RAM), read only memory (ROM), flash memory, or any other suitable memory systems. For example, the memory device 504 may include dynamic random access memory (DRAM). The memory device 504 may include device drivers 510 that are configured to execute the instructions for generating virtual input devices. The device drivers 510 may be software, an application program, application code, or the like.

The CPU 502 may also be connected through the bus 506 to an input/output (I/O) device interface 512 configured to connect the computing device 500 to one or more I/O devices 514. The I/O devices 514 may include, for example, a keyboard and a pointing device, wherein the pointing device may include a touchpad or a touchscreen, among others. The I/O devices 514 may be built-in components of the computing device 500, or may be devices that are externally connected to the computing device 500. In some examples, the memory 504 may be communicatively coupled to I/O devices 514 through direct memory access (DMA).

The CPU 502 may also be linked through the bus 506 to a display interface 516 configured to connect the computing device 500 to a display device 518. The display device 518 may include a display screen that is a built-in component of the computing device 500. The display device 518 may also include a computer monitor, television, or projector, among others, that is internal to or externally connected to the computing device 500.

The computing device 500 also includes a storage device 520. The storage device 520 is a physical memory such as a hard drive, an optical drive, a thumbdrive, an array of drives, a solid-state drive, or any combinations thereof. The storage device 520 may also include remote storage drives.

The computing device 500 may also include a network interface controller (NIC) 522. The NIC 522 may be configured to connect the computing device 500 through the bus 506 to a network 524. The network 524 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 500 further includes a dynamic vision sensor 526. Dynamic vision sensor 526 may be a low bit rate, low power consumption camera sensor. Unlike standard cameras, where videos are captured in a synchronous manner, DVS cameras may be completely asynchronous, generating information only when changes in the perceived video frames happen over time. For example, the dynamic vision sensor 526 may include one or more smart pixels. In some examples, the each of the smart pixels may operate as a separate entity. For example, the smart pixels may each generate information about the perceived image asynchronously. The smart pixels may generate information to indicate changes in the perceived light intensity. This information may be conveyed as events including a polarity and amount of change in light intensity. In some examples, an event can take the form of a binary flag, indicating the polarity of the event—'1' for positive change in perceived light intensity and '0' for negative change in perceived light intensity, and the pixel addresses and time stamps in which each event happened. The dynamic vision sensor 526 may have excellent temporal resolution, capable of generating events with timing precision of up to 1 microsecond. For example, a normal operation of the dynamic vision sensor 526 may be equivalent to standard camera sensors sampling at approximately 20,000 fps in most video capture scenarios.

The computing device 500 further includes a video processor 528. For example, the video processor 528 can be used to encode captured video to be sent to an object detector for object detection. The video processor 528 can include a receiver 530, a heat map generator 532, an ROI map generator 534, a parameter adjuster 536, a video encoder 538, and a video transmitter 540. In some examples, each of the components 530-540 of the video processor 528 may be a microcontroller, embedded processor, or software module. The receiver 530 can receive an event from a dynamic vision sensor and a video frame from an image sensor. In some examples, the event may be a positive event or a negative event. In some examples, the receiver 530 can receive expected object regions from a video database. In some examples, the receiver 530 can receive an object detection in a previous frame. The heat map generator 532 can generate a heat map based on the received event. For example, the heat map generator 532 can generate the heat map based on a combined event matrix generated from a positive event matrix and a negative event matrix. In some examples, the heat map may include hot areas corresponding to new temporal activity. The ROI map generator 534 can generate a ROI map based on the heat map. In some examples, the ROI map generator 534 can detect regions of interest based on the expected object regions and the heat map and generate the ROI map based on the detected regions of interest. In some examples, the ROI map generator 534 can detect regions of interest based on the object detection and the heat map and generate the ROI map based on the detected regions of interest. In some examples, the ROI map generator 534 can detect regions of interest based on a detected new object in the video frame and the heat map and generate the ROI map based on the detected regions of interest. The parameter adjuster 536 can adjust an encoding parameter based on the ROI map. The video encoder 538 can encode the video frame using the adjusted parameter. For example, the encoded video frame may include an area of new temporal activity encoded in higher fidelity and an area of no new temporal activity encoded in lower fidelity. The video transmitter 540 can transmit the encoded video frame to an object detector.

The block diagram of FIG. 5 is not intended to indicate that the computing device 500 is to include all of the components shown in FIG. 5. Rather, the computing device 500 can include fewer or additional components not illustrated in FIG. 5, such as additional buffers, additional processors, and the like. The computing device 500 may include any number of additional components not shown in FIG. 5, depending on the details of the specific implementation. Furthermore, any of the functionalities of the CPU 502 may be partially, or entirely, implemented in hardware and/or in a processor. For example, the functionality of the video processor 528 may be implemented with an application specific integrated circuit, in logic implemented in a processor, in logic implemented in a specialized graphics processing unit such as the GPU 508, or in any other device.

Figure 6:
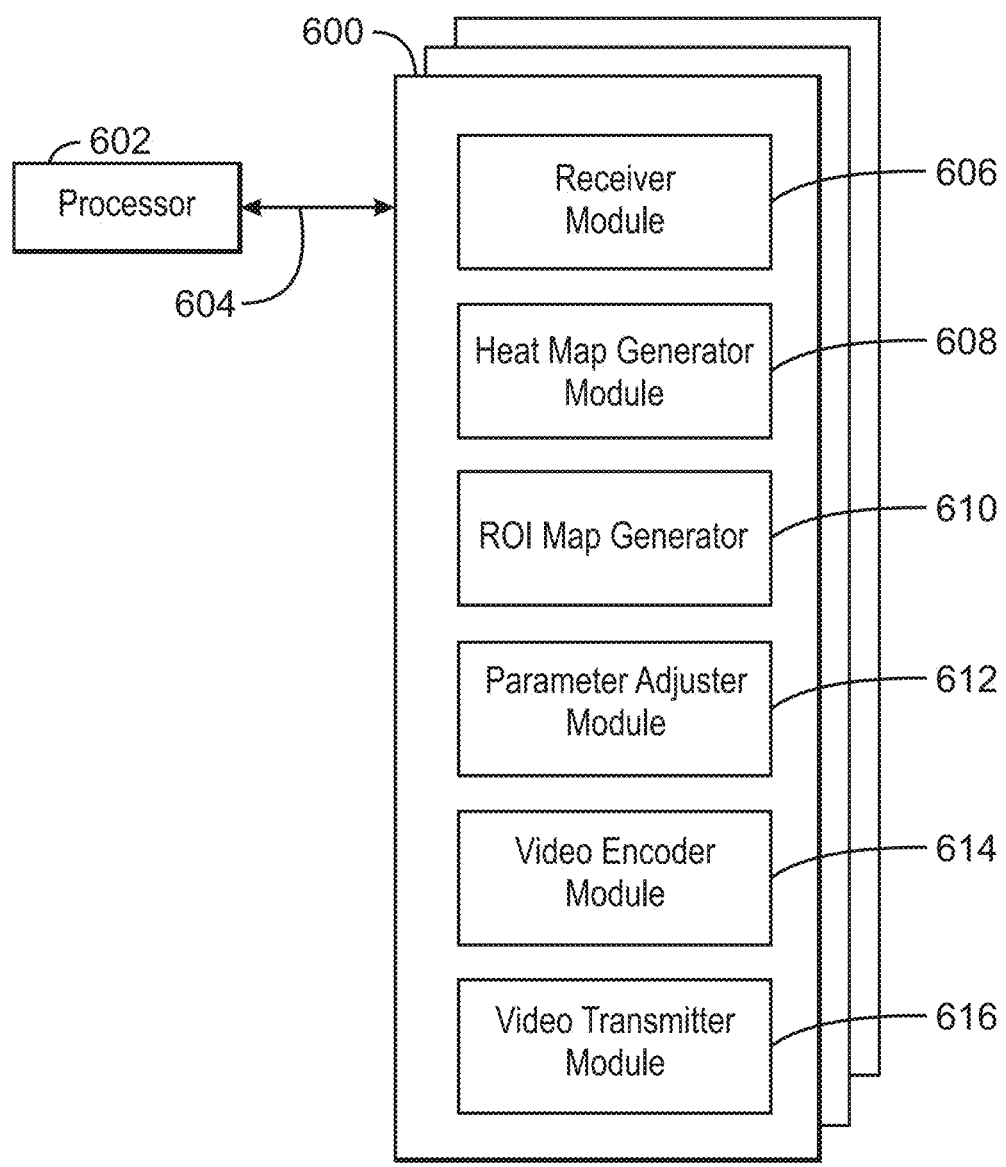
FIG. 6 is a block diagram showing computer readable media that store code for encoding video using heat maps generated using dynamic vision sensor events.

FIG. 6 is a block diagram showing computer readable media 600 that store code for encoding video using heat maps generated using dynamic vision sensor events. The computer readable media 600 may be accessed by a processor 602 over a computer bus 604. Furthermore, the computer readable medium 600 may include code configured to direct the processor 602 to perform the methods described herein. In some embodiments, the computer readable media 600 may be non-transitory computer readable media. In some examples, the computer readable media 600 may be storage media.

The various software components discussed herein may be stored on one or more computer readable media 600, as indicated in FIG. 6. For example, a receiver module 606 may be configured to receive events from a dynamic vision sensor and a video frame from an image sensor. In some examples, the events may include a negative event or a positive event corresponding to a change in light intensity detected at a smart pixel of the dynamic vision sensor. A heat map generator module 608 may be configured to generate a heat map based on the received events. In some examples, the heat map generator module 608 may be configured to generate a positive event matrix and a negative event matrix, and to generate a combined event matrix based on the positive event matrix and the negative event matrix. The heat map generator module 608 can then generate the heat map based on the combined event matrix. An ROI map generator module 610 may be configured to generate a region of interest (ROI) map based on the heat map. For example, the ROI map generator module 610 may be configured to generate the ROI map based on regions of interest. In some examples, the ROI map generator module 610 may be configured to detect regions of interest based on expected object regions from a video database and the heat map and generate the ROI map based on the detected regions of interest. In some examples, the ROI map generator module 610 may be configured to detect regions of interest based on object detection in a previous frame and the heat ma, and generate the ROI map based on the detected regions of interest. In some examples, the ROI map generator module 610 may be configured to detect regions of interested based on a detected new object in the video frame and the heat map and generate the ROI map based on the detected regions of interest. A parameter adjuster module 612 may be configured to adjust an encoding parameter based on the ROI map. For example, the parameter adjuster module 612 may be configured to adjust the encoding parameter based on the ROI map to improve the performance of the computer vision algorithms for a given bandwidth. For example, the parameter adjuster module 612 may be configured to increase a quantization parameter of a macroblock of the video frame in response to detecting that the macroblock does not correspond to any region of interest in the ROI map. The parameter adjuster module 612 may also be configured to decrease a quantization parameter of a macroblock of the video frame in response to detecting that the macroblock corresponds to a region of interest in the ROI map. A video encoder module 614 may be configured to encode the video frame using the adjusted parameter. In some examples, the video encoder module 614 may be configured to encode an area of the video frame corresponding to a region of interest encoded in higher fidelity and encode an area of the video frame not corresponding to any region of interest encoded in lower fidelity. For example, the video encoder module 614 may be configured to compress macroblocks with higher quantization parameter (QP) values more than macroblocks with lower QP values. A video transmitter module 616 may be configured to transmit the encoded video frame to an object detector.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation.

EXAMPLES

Example 1 is an apparatus for encoding video frames. The apparatus includes a receiver to receive events from a dynamic vision sensor and a video frame from an image sensor. The apparatus also includes a heat map generator to generate a heat map based on the received events. The apparatus further includes a region of interest (ROI) map generator to generate a ROI map based on the heat map. The apparatus also further includes a parameter adjuster to adjust an encoding parameter based on the ROI map; and a video encoder to encode the video frame using the adjusted parameter.

Example 2 includes the apparatus of example 1, including or excluding optional features. In this example, the apparatus includes a video transmitter to transmit the encoded video frame to an object detector.

Example 3 includes the apparatus of any one of examples 1 to 2, including or excluding optional features. In this example, the heat map includes hot areas corresponding to new temporal activity.

Example 4 includes the apparatus of any one of examples 1 to 3, including or excluding optional features. In this example, the encoded video frame includes an area of new temporal activity encoded in higher fidelity and an area of no new temporal activity encoded in lower fidelity.

Example 5 includes the apparatus of any one of examples 1 to 4, including or excluding optional features. In this example, the events include a positive event or a negative event.

Example 6 includes the apparatus of any one of examples 1 to 5, including or excluding optional features. In this example, the heat map generator is to generate the heat map based on a combined event matrix generated from a positive event matrix and a negative event matrix.

Example 7 includes the apparatus of any one of examples 1 to 6, including or excluding optional features. In this example, the receiver is to receive expected object regions from a video database, the ROI map generator to detect regions of interest based on the expected object regions and the heat map and generate the ROI map based on the detected regions of interest.

Example 8 includes the apparatus of any one of examples 1 to 7, including or excluding optional features. In this example, the receiver is to receive an object detection in a previous frame, the ROI map generator to detect regions of interest based on the object detection and the heat map and generate the ROI map based on the detected regions of interest.

Example 9 includes the apparatus of any one of examples 1 to 8, including or excluding optional features. In this example, the ROI map generator is to detect regions of interest based on a detected new object in the video frame and the heat map and generate the ROI map based on the detected regions of interest.

Example 10 includes the apparatus of any one of examples 1 to 9, including or excluding optional features. In this example, the dynamic vision sensor includes a plurality of smart pixels to capture video frames at a high frame rate.

Example 11 is a method for encoding video frames. The method includes receiving, at a processor, events from a dynamic vision sensor and a video frame from an image sensor. The method also includes generating, via the processor, a heat map based on the received events. The method further includes generating, via the processor, a region of interest (ROI) map based on the heat map. The method also further includes adjusting, via the processor, an encoding parameter based on the ROI map. The method further includes encoding, via the processor, the video frame using the adjusted parameter.

Example 12 includes the method of example 11, including or excluding optional features. In this example, the method includes sending, via the processor, the encoded video frame to an object detector.

Example 13 includes the method of any one of examples 11 to 12, including or excluding optional features. In this example, generating the heat map includes generating a positive event matrix and a negative event matrix, generating a combined event matrix based on the positive event matrix and the negative event matrix, and generating the heat map based on the combined event matrix.

Example 14 includes the method of any one of examples 11 to 13, including or excluding optional features. In this example, generating the ROI map includes detecting regions of interest based on received expected object regions and the heat map and generating the ROI map based on the detected regions of interest.

Example 15 includes the method of any one of examples 11 to 14, including or excluding optional features. In this example, generating the ROI map includes detecting regions of interest based on an object detection from a previous frame and the heat map and generating the ROI map based on the detected regions of interest.

Example 16 includes the method of any one of examples 11 to 15, including or excluding optional features. In this example, generating the ROI map includes detecting regions of interest based on a detected new object in the video frame and the heat map and generating the ROI map based on the detected regions of interest.

Example 17 includes the method of any one of examples 11 to 16, including or excluding optional features. In this example, adjusting the encoding parameter includes increasing a quantization parameter of a macroblock of the video frame in response to detecting that the macroblock does not correspond to any region of interest in the ROI map.

Example 18 includes the method of any one of examples 11 to 17, including or excluding optional features. In this example, adjusting the encoding parameter includes decreasing a quantization parameter of a macroblock of the video frame in response to detecting that the macroblock corresponds to a region of interest in the ROI map.

Example 19 includes the method of any one of examples 11 to 18, including or excluding optional features. In this example, encoding the video frame using the adjusted parameter includes compressing macroblocks with higher quantization parameter (QP) values more than macroblocks with lower QP values.

Example 20 includes the method of any one of examples 11 to 19, including or excluding optional features. In this example, the events include a negative event or a positive event corresponding to a change in light intensity detected at a smart pixel of the dynamic vision sensor.

Example 21 is at least one computer readable medium for encoding video frames having instructions stored therein that. The computer-readable medium includes instructions that direct the processor to receive events from a dynamic vision sensor and a video frame from an image sensor. The computer-readable medium also includes instructions to generate a heat map based on the received events. The computer-readable medium further includes instructions to generate a region of interest (ROI) map based on the heat map. The computer-readable medium also further includes instructions to adjust an encoding parameter based on the ROI map. The computer-readable medium further includes instructions to encode the video frame using the adjusted parameter.

Example 22 includes the computer-readable medium of example 21, including or excluding optional features. In this example, the computer-readable medium includes instructions to transmit the encoded video frame to an object detector.

Example 23 includes the computer-readable medium of any one of examples 21 to 22, including or excluding optional features. In this example, the computer-readable medium includes instructions to generate a positive event matrix and a negative event matrix, and to generate a combined event matrix based on the positive event matrix and the negative event matrix.

Example 24 includes the computer-readable medium of any one of examples 21 to 23, including or excluding optional features. In this example, the computer-readable medium includes instructions to detect regions of interest based on expected object regions from a video database and the heat map, and to generate the ROI map based on the detected regions of interest.

Example 25 includes the computer-readable medium of any one of examples 21 to 24, including or excluding optional features. In this example, the computer-readable medium includes instructions to detect regions of interest based on object detection in a previous frame and the heat map, and to generate the ROI map based on the detected regions of interest.

Example 26 includes the computer-readable medium of any one of examples 21 to 25, including or excluding optional features. In this example, the computer-readable medium includes instructions to detect regions of interest based on a detected new object in the video frame and the heat map and generate the ROI map based on the detected regions of interest.

Example 27 includes the computer-readable medium of any one of examples 21 to 26, including or excluding optional features. In this example, the computer-readable medium includes instructions to increase a quantization parameter of a macroblock of the video frame in response to detecting that the macroblock does not correspond to any region of interest in the ROI map.

Example 28 includes the computer-readable medium of any one of examples 21 to 27, including or excluding optional features. In this example, the computer-readable medium includes instructions to decrease a quantization parameter of a macroblock of the video frame in response to detecting that the macroblock corresponds to a region of interest in the ROI map.

Example 29 includes the computer-readable medium of any one of examples 21 to 28, including or excluding optional features. In this example, the computer-readable medium includes instructions to compress macroblocks with higher quantization parameter (QP) values more than macroblocks with lower QP values.

Example 30 includes the computer-readable medium of any one of examples 21 to 29, including or excluding optional features. In this example, the events include a negative event or a positive event corresponding to a change in light intensity detected at a smart pixel of the dynamic vision sensor.

Example 31 is a system for encoding video frames. The system includes a receiver to receive events from a dynamic vision sensor and a video frame from an image sensor. The system also includes a heat map generator to generate a heat map based on the received events. The system further includes a region of interest (ROI) map generator to generate a ROI map based on the heat map. The system also further includes a parameter adjuster to adjust an encoding parameter based on the ROI map. The system further includes a video encoder to encode the video frame using the adjusted parameter.

Example 32 includes the system of example 31, including or excluding optional features. In this example, the system includes a video transmitter to transmit the encoded video frame to an object detector.

Example 33 includes the system of any one of examples 31 to 32, including or excluding optional features. In this example, the heat map includes hot areas corresponding to new temporal activity.

Example 34 includes the system of any one of examples 31 to 33, including or excluding optional features. In this example, the encoded video frame includes an area of new temporal activity encoded in higher fidelity and an area of no new temporal activity encoded in lower fidelity.

Example 35 includes the system of any one of examples 31 to 34, including or excluding optional features. In this example, the events include a positive event or a negative event.

Example 36 includes the system of any one of examples 31 to 35, including or excluding optional features. In this example, the heat map generator is to generate the heat map based on a combined event matrix generated from a positive event matrix and a negative event matrix.

Example 37 includes the system of any one of examples 31 to 36, including or excluding optional features. In this example, the receiver is to receive expected object regions from a video database, the ROI map generator to detect regions of interest based on the expected object regions and the heat map and generate the ROI map based on the detected regions of interest.

Example 38 includes the system of any one of examples 31 to 37, including or excluding optional features. In this example, the receiver is to receive an object detection in a previous frame, the ROI map generator to detect regions of interest based on the object detection and the heat map and generate the ROI map based on the detected regions of interest.

Example 39 includes the system of any one of examples 31 to 38, including or excluding optional features. In this example, the ROI map generator is to detect regions of interest based on a detected new object in the video frame and the heat map and generate the ROI map based on the detected regions of interest.

Example 40 includes the system of any one of examples 31 to 39, including or excluding optional features. In this example, the dynamic vision sensor includes a plurality of smart pixels to capture video frames at a high frame rate.

Example 41 is a system for encoding video frames. The system includes means for receiving events from a dynamic vision sensor and a video frame from an image sensor. The system also includes means for generating a heat map based on the received events. The system further includes means for generating a ROI map based on the heat map. The system also further includes means for adjusting an encoding parameter based on the ROI map. The system also includes and means for encoding the video frame using the adjusted parameter.

Example 42 includes the system of example 41, including or excluding optional features. In this example, the system includes means for transmitting the encoded video frame to an object detector.

Example 43 includes the system of any one of examples 41 to 42, including or excluding optional features. In this example, the heat map includes hot areas corresponding to new temporal activity.

Example 44 includes the system of any one of examples 41 to 43, including or excluding optional features. In this example, the encoded video frame includes an area of new temporal activity encoded in higher fidelity and an area of no new temporal activity encoded in lower fidelity.

Example 45 includes the system of any one of examples 41 to 44, including or excluding optional features. In this example, the events include a positive event or a negative event.

Example 46 includes the system of any one of examples 41 to 45, including or excluding optional features. In this example, the means for generating the heat map is to generate the heat map based on a combined event matrix generated from a positive event matrix and a negative event matrix.

Example 47 includes the system of any one of examples 41 to 46, including or excluding optional features. In this example, the means for receiving events is to receive expected object regions from a video database, the means for generating the ROI map to detect regions of interest based on the expected object regions and the heat map and generate the ROI map based on the detected regions of interest.

Example 48 includes the system of any one of examples 41 to 47, including or excluding optional features. In this example, the means for receiving events is to receive an object detection in a previous frame, the means for generating the ROI map to detect regions of interest based on the object detection and the heat map and generate the ROI map based on the detected regions of interest.

Example 49 includes the system of any one of examples 41 to 48, including or excluding optional features. In this example, the means for generating the ROI map is to detect regions of interest based on a detected new object in the video frame and the heat map and generate the ROI map based on the detected regions of interest.

Example 50 includes the system of any one of examples 41 to 49, including or excluding optional features. In this example, the dynamic vision sensor includes a plurality of smart pixels to capture video frames at a high frame rate.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for encoding video frames, comprising a processor to:
    receive events from a dynamic vision sensor and a video frame from an image sensor;
    generate a heat map based on the received events;
    generate a ROI map based on the heat map;
    adjust an encoding parameter based on the ROI map; and
    encode the video frame using the adjusted parameter.

2. The apparatus of claim 1, wherein the processor is to transmit the encoded video frame to an object detector.

3. The apparatus of claim 1, wherein the heat map comprises hot areas corresponding to new temporal activity.

4. The apparatus of claim 1, wherein the encoded video frame comprises an area of new temporal activity encoded in higher fidelity and an area of no new temporal activity encoded in lower fidelity.

5. The apparatus of claim 1, wherein the events comprise a positive event or a negative event.

6. The apparatus of claim 1, wherein the processor is to generate the heat map based on a combined event matrix generated from a positive event matrix and a negative event matrix.

7. The apparatus of claim 1, wherein the processor is to receive expected object regions from a video database, detect regions of interest based on the expected object regions and the heat map, and generate the ROI map based on the detected regions of interest.

8. The apparatus of claim 1, wherein the processor is to receive an object detection in a previous frame, detect regions of interest based on the object detection and the heat map, and generate the ROI map based on the detected regions of interest.

9. The apparatus of claim 1, wherein the processor is to detect regions of interest based on a detected new object in the video frame and the heat map and generate the ROI map based on the detected regions of interest.

10. The apparatus of claim 1, wherein the dynamic vision sensor comprises a plurality of smart pixels to capture video frames at a high frame rate.

11. A method for encoding video frames, comprising:
receiving, at a processor, events from a dynamic vision sensor and a video frame from an image sensor;
generating, via the processor, a heat map based on the received events;
generating, via the processor, a region of interest (ROI) map based on the heat map;
adjusting, via the processor, an encoding parameter based on the ROI map; and
encoding, via the processor, the video frame using the adjusted encoding parameter.

12. The method of claim 11, comprising sending, via the processor, the encoded video frame to an object detector.

13. The method of claim 11, wherein generating the heat map comprises generating a positive event matrix and a negative event matrix, generating a combined event matrix based on the positive event matrix and the negative event matrix, and generating the heat map based on the combined event matrix.

14. The method of claim 11, wherein generating the ROI map comprises detecting regions of interest based on received expected object regions and the heat map and generating the ROI map based on the detected regions of interest.

15. The method of claim 11, wherein generating the ROI map comprises detecting regions of interest based on an object detection from a previous frame and the heat map and generating the ROI map based on the detected regions of interest.

16. The method of claim 11, wherein generating the ROI map comprises detecting regions of interest based on a detected new object in the video frame and the heat map and generating the ROI map based on the detected regions of interest.

17. The method of claim 11, wherein adjusting the encoding parameter comprises increasing a quantization parameter of a macroblock of the video frame in response to detecting that the macroblock does not correspond to any region of interest in the ROI map.

18. The method of claim 11, wherein adjusting the encoding parameter comprises decreasing a quantization parameter of a macroblock of the video frame in response to detecting that the macroblock corresponds to a region of interest in the ROI map.

19. The method of claim 11, wherein encoding the video frame using the adjusted encoding parameter comprises compressing macroblocks with higher quantization parameter (QP) values more than macroblocks with lower QP values.

20. The method of claim 11, wherein the events comprise a negative event or a positive event corresponding to a change in light intensity detected at a smart pixel of the dynamic vision sensor.

21. At least one non-transitory computer readable medium for encoding video frames having instructions stored therein that, in response to being executed on a computing device, cause the computing device to:
receive events from a dynamic vision sensor and a video frame from an image sensor;
generate a heat map based on the received events;
generate a region of interest (ROI) map based on the heat map;
adjust an encoding parameter based on the ROI map; and
encode the video frame using the adjusted parameter.

22. The at least one non-transitory computer readable medium of claim 21, comprising instructions to transmit the encoded video frame to an object detector.

23. The at least one non-transitory computer readable medium of claim 21, comprising instructions to generate a positive event matrix and a negative event matrix, and to generate a combined event matrix based on the positive event matrix and the negative event matrix.

24. The at least one non-transitory computer readable medium of claim 21, comprising instructions to detect regions of interest based on expected object regions from a video database and the heat map, and to generate the ROI map based on the detected regions of interest.

25. The at least one non-transitory computer readable medium of claim 21, comprising instructions to detect regions of interest based on object detection in a previous frame and the heat map, and to generate the ROI map based on the detected regions of interest.

* * * * *